(12) United States Patent
Gerber et al.

(10) Patent No.: US 10,277,971 B2
(45) Date of Patent: Apr. 30, 2019

(54) MALLEABLE EARPIECE FOR ELECTRONIC DEVICES

(71) Applicant: ROXILLA LLC, New York, NY (US)

(72) Inventors: Danielle Evin Gerber, New York, NY (US); Frank Filipetti, West Nyack, NY (US); Rock G. Positano, New York, NY (US)

(73) Assignee: Roxilla LLC, New York, NY (US)

( * ) Notice: Subject to any disclaimer, the term of this patent is extended or adjusted under 35 U.S.C. 154(b) by 0 days.

(21) Appl. No.: 15/487,699

(22) Filed: Apr. 14, 2017

(65) Prior Publication Data
US 2017/0318372 A1    Nov. 2, 2017

Related U.S. Application Data

(60) Provisional application No. 62/353,382, filed on Jun. 22, 2016, provisional application No. 62/328,918, filed on Apr. 28, 2016.

(51) Int. Cl.
*H04R 1/10* (2006.01)
*H04R 25/00* (2006.01)
(Continued)

(52) U.S. Cl.
CPC ......... *H04R 1/1016* (2013.01); *H04R 1/1008* (2013.01); *H04R 1/26* (2013.01);
(Continued)

(58) Field of Classification Search
CPC .. H04R 1/1016; H04R 1/1033; H04R 1/1041; H04R 1/105; H04R 1/1091;
(Continued)

(56) References Cited

U.S. PATENT DOCUMENTS 4,982,434 A    1/1991  Lenhardt et al.
2002/0012441 A1*  1/2002  Matsunaga ............ A42B 1/245
                                                                    381/381
(Continued)

FOREIGN PATENT DOCUMENTS

EP    3125573 A1    2/2017
WO    2007069784 A1    6/2007

OTHER PUBLICATIONS

AfterShokz, AfterShokz—https://aftershokz.com/, Accessed Jun. 24, 2016.

(Continued)

*Primary Examiner* — Andrew L Sniezek
(74) *Attorney, Agent, or Firm* — Amster Rothstein and Ebenstein

(57) ABSTRACT

An earpiece for reproducing audio has multiple drivers, including a bone conduction bass driver and an air conduction treble driver, attached to the ends of a malleable, yet stiff, tubing. The bass driver is placed behind or over the ear to provide a high quality bass output while the treble driver is placed so as to extend in proximity to the user's ear canal. The malleable, yet stiff, tubing enables a user to bend the earpiece and thereby position the earpiece comfortably and securely around the user's ear and to optimally position the drivers in the desired positions around the user's ear. The tubing also allows the earpiece, when not in use, to be reshaped for easy storage or to be worn as an accessory. The earpiece may also include one or more microphones with the treble and/or bass drivers.

4 Claims, 17 Drawing Sheets

(51) Int. Cl.
| | |
|---|---|
| *H04R 1/26* | (2006.01) |
| *G02C 11/06* | (2006.01) |
| *H04R 1/02* | (2006.01) |
| *H04R 5/033* | (2006.01) |
| *H04S 1/00* | (2006.01) |

(52) U.S. Cl.
CPC .............. *G02C 11/06* (2013.01); *H04R 1/028* (2013.01); *H04R 1/105* (2013.01); *H04R 1/1025* (2013.01); *H04R 1/1033* (2013.01); *H04R 1/1041* (2013.01); *H04R 5/033* (2013.01); *H04R 2201/023* (2013.01); *H04R 2201/107* (2013.01); *H04R 2205/041* (2013.01); *H04R 2225/63* (2013.01); *H04R 2420/07* (2013.01); *H04R 2420/09* (2013.01); *H04R 2460/13* (2013.01); *H04S 1/005* (2013.01); *H04S 2420/01* (2013.01)

(58) Field of Classification Search
CPC ............ H04R 2420/07; H04R 2460/13; H04R 25/552; H04R 25/70; H04R 25/65; H04R 25/60; H04R 2225/63; H04R 2225/021; H04R 1/1008; G02C 11/06
See application file for complete search history.

(56) References Cited

U.S. PATENT DOCUMENTS

| | | | | |
|---|---|---|---|---|
| 2006/0120546 | A1 | 6/2006 | Tanaka et al. | |
| 2008/0107289 | A1 | 5/2008 | Retchin et al. | |
| 2008/0107300 | A1 | 5/2008 | Chen | |
| 2008/0112581 | A1* | 5/2008 | Kim ..................... | H04R 1/1075 381/151 |
| 2009/0290730 | A1 | 11/2009 | Fukuda et al. | |
| 2011/0301729 | A1 | 12/2011 | Heiman et al. | |
| 2013/0051585 | A1* | 2/2013 | Karkkainen ......... | H04R 1/1075 381/151 |
| 2013/0216087 | A1* | 8/2013 | MacDonald ........... | H04R 1/105 381/381 |
| 2013/0301845 | A1* | 11/2013 | Royal ................. | G10K 11/175 381/71.6 |
| 2014/0078462 | A1* | 3/2014 | Abreu .................... | G02C 3/003 351/111 |
| 2014/0119589 | A1 | 5/2014 | Wyzisk et al. | |
| 2015/0133716 | A1* | 5/2015 | Suhami ................. | A61N 2/002 600/9 |
| 2015/0146880 | A1 | 5/2015 | Boni | |
| 2015/0358720 | A1 | 12/2015 | Campbell | |

OTHER PUBLICATIONS

Apple Receives Patent for Headphones Using Bone Conduction to Improve Hearing in Noise, http://hearinghealthmatters.org, by HHTM, http://hearinghealthmatters.org/hearingnewswatch/2016/applepatentheadphonesusingboneconductionimprovehearingnoise/ (dated Jun. 9, 2016).

Audio Bone Headphones Bone conduction waterproof headphones for sports, running and swimming, http://www.audioboneheadphones.com/ (accessed Jun. 24, 2016).

Best Bone Conduction Headphones of 2016: A Complete Guide Everyday Hearing, Lindsey Banks, Au.D., http://www.everydayhearing.com/hearingtechnology/articles/boneconductionheadphones/, (accessed Jun. 24, 2016).

Bluez 2S AfterShokz, www.aftershokz.com, http://www.aftershokz.com/collections/wireless/products/bluez2s, (accessed Jun. 24, 2016).

Bone conduction, wikipedia, (accessed Jun. 24, 2016) https://en.wikipedia.org/wiki/Bone_conduction.

Cynaps: Bone Conduction Caps & Headsets Home of the Cynaps Project: bone conduction devices integrated into various headgear (accessed Jun. 24, 2016) http://www.maxvirtual.com/.

EarHero Earphones, www.theawesomer.com, (accessed Jun. 24, 2016) http://theawesomer.com/earheroearphones/233586/.

This wristband turns your fingers into a phone, Jacob Kastrenakes, www.theverge.com (Aug. 31, 2016) http://www.theverge.com/circuitbreaker/2016/8/31/12731214/sgnlkickstarterwristbandsamsunginnomdlelab.

Headphones without speakers? Sound Band makes it a reality, Dave LeClair, www.gizmag.com (Aug. 12, 2013) http://www.gizmag.com/soundbandspeakerlessheadphones/28661/.

Hybratech—ORB, Hybra advance technology, hybratech.com (accessed Apr. 7, 2017), http://www.hybratech.com/ORB.aspx.

O.R.B. picture (undated).

The ORB fits a Bluetooth headset into wearable ring design, Matthew Humphries, www.geek.com, dated Jul. 27, 2009, (Accessed Jun. 16, 2017) https://www.geek.com/gadgets/the-orb-fits-a-bluetooth-headset-into-wearable-ring-design-851502/.

Jabra Storm Around ear bluetooth headset, www.jabra.com, (accessed Jun. 24, 2016) http://www.jabra.com/bluetoothheadsets/jabrastorm.

Hybratech—Sound Band, www.hybratech.com (accessed Jun. 24, 2016) http://www.hybratech.com/SoundBand.aspx.

Oculus Rift Virtual Reality Headset, Step into Rift, Oculus Rift Virtualreality Headset, www.bestbuy.com, (accessed Jun. 24, 2016) http://www.bestbuy.com/site/c;[/oculusriftvroffer/pcmcat748301736879.c?id=pcmcat748301736879.

Products AfterShokz, www.aftershokz.com (accessed Jun. 24, 2016) http://aftershokz.com/collections/all.

International Search Report for PCT/US2017/029899 dated Jul. 18, 2017.

Written Opinion for PCT/US2017/029899 dated Jul. 18, 2017.

Solfeggio frequencies—Wikipedia, the free encyclopedia—Infinite Shift; wordpress.com; (accessed Jun. 24, 2016) https://infiniteshift.wordpress.com/2013/03/13/solfeggiofrequencieswikipediathefreeencyclopedia/.

Sound Band Finally, a headset without speakers! by Hybra Advance Technology, Inc., Kickstarter.com (Accessed Jun. 27, 2017) https://www.kickstarter.com/projects/hybratech/sound-band-finally-a-headset-without-speakers.

Hybra Sound Band (Accessed Jun. 24, 2016) http://www.soundband.com/.

Technology AfterShokz, www.aftershokz.com (Accessed Jun. 24, 2016) http://aftershokz.com/pages/technology.

Slide2COR Auricle (anatomy) Wikipedia, (Oct. 30, 2013) https://en.wikipedia.org/wiki/Auricle_(anatomy)#/media/File:Slide2COR.JPG.

Virtual Private Theater Glasses 52 Inch Wide Screen Display, www.spexis.com (Accessed Jun. 24, 2016) http://www.spexis.com.au/other/273virtualprivatetheaterglasses52inchwidescreendisplay.html?search_query=glasses&results=5&HTTP.

Zungle: Wear the Beast by Zungle, www.kickstarter.com (Accessed Jun. 24, 2016) https://www.kickstarter.com/projects/zungle/zungle-wear-the-beats/description.

Conduit headphones combine earbuds with bone conduction, www.newatlas.com, (Apr. 20, 2017) http://newatlas.com/conduit-sports-bone-conduction-earbuds/49125/.

Intertragic notch, www.wikipedia.com, (accessed Jun. 24, 2016) https://en.wikipedia.org/wiki/Intertragic_notch.

Zelco Outi Feel the Vibe Earphones, www.qvc.com, (Accessed Jun. 27, 2017) http://www.qvc.com/Zelco-Outi-Feel-the-Vibe-Earphones.product.E192035.html.

Conduit Sports—The World's First In/Off-Ear Headphones, www.kickstarter.com, (Accessed Jun. 27, 2017) https://www.kickstarter.com/projects/conduitsports/conduit-sports-dynamic-bone-conducting-headphones.

Conduit Sports—Dynamic Bone Conducting Headphones, Apr. 18, 2017, https://www.youtube.com/watch?v=9Ybvxj7rRcU.

An ear out for a good invention, Claire Heaney, Herald Sun, Apr. 26, 2017, http://www.heraldsun.com.au/business/an-ear-out-for-a-good-invention/news-story/9bfdf349aca0d4688826e35625b0dfe4.

Conduit Sports—Dynamic Bone Conducting Headphones, www.backerkit.com, Accessed Jun. 27, 2017, https://www.backerkit.com/projects/conduitsports/conduit-sports-dynamic-bone-conducting-headphones.

(56) References Cited

OTHER PUBLICATIONS

Hi-Call, Bluetooth Talking Glove, Black Man Size, www.hi-fun.com (Accessed Jun. 9, 2017) http://www.hi-fun.com/en/pagina/1548-hi-call-black-man-size.
Talk to the hand: The mobile phone glove that lets you leave your handset in your pocket (but get ready for some strange looks, Mark Prigg, www.dailymail.com, (Last Updated Oct. 2, 2012) http://www.dailymail.co.uk/sciencetech/article-2211637/Talk-hand-The-mobile-phone-glove-lets-leave-handset-pocket.html.
Jen Agresta & Sarah Wassner Flynn, National Geographic Kids 2016 (50 picture-packed top 8 lists! cover page, copyright page and p. 83).

\* cited by examiner

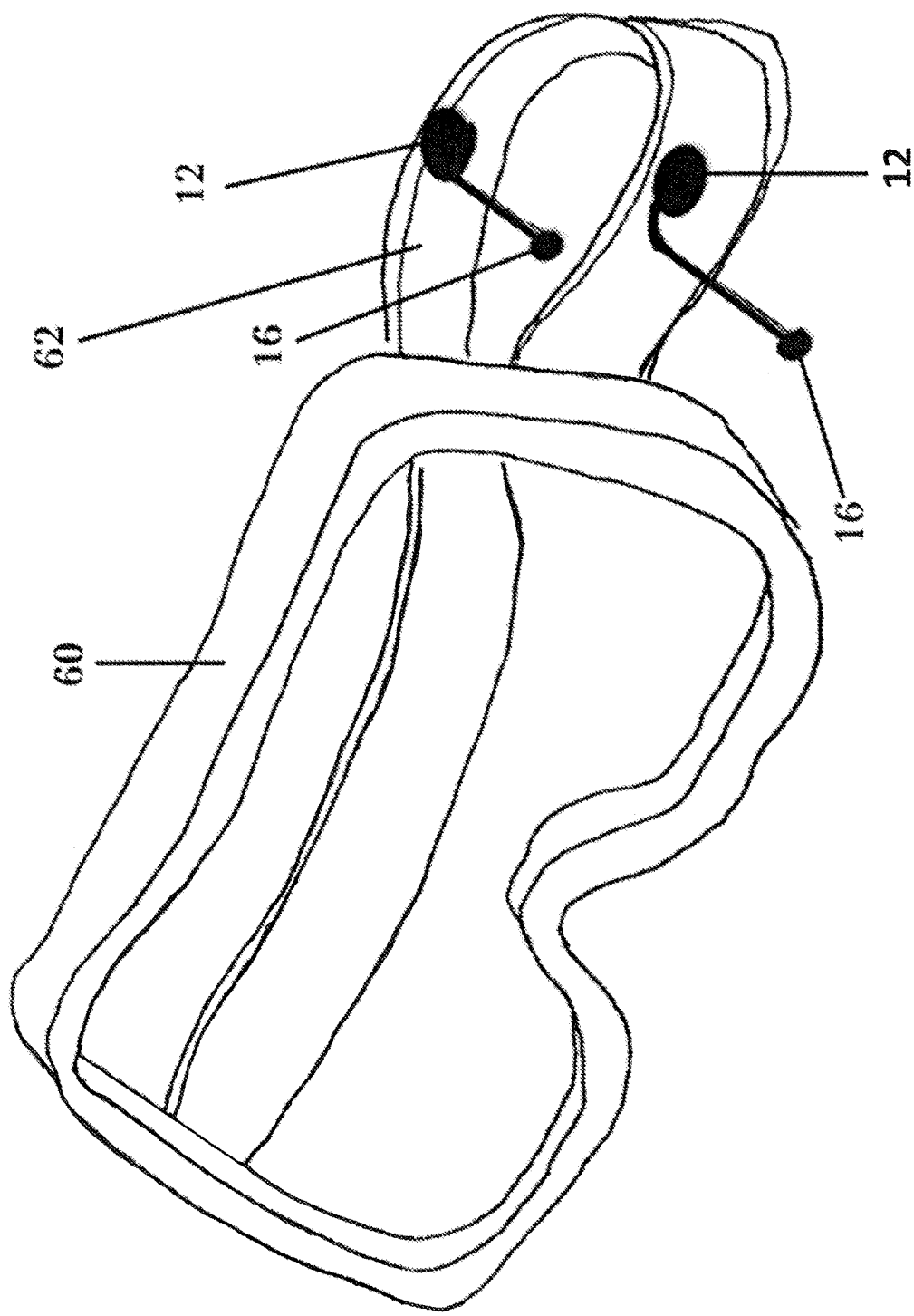

MALLEABLE EARPIECE FOR ELECTRONIC DEVICES

CROSS-REFERENCE TO RELATED APPLICATIONS

This application claims priority to and the benefit of U.S. Provisional Application Ser. No. 62/328,918, filed on Apr. 28, 2016, and U.S. Provisional Application Ser. No. 62/353,382, filed on Jun. 22, 2016. The entire contents of each of these applications is incorporated by reference herein.

FIELD OF THE INVENTION

The present invention generally relates to an earpiece that is configured to be multipositional behind, or above, and around a user's ear and output a high quality sound via the use of separate drivers for high and low frequencies while allowing a user to also hear ambient sounds.

BACKGROUND OF THE INVENTION

Conventional headphones for outputting high quality audio often either cover the outer ear or are positioned in the ear canal. Such conventional headphones block out or dampen many ambient sounds that interfere with a user listening to the audio that is reproduced over the headphones. However, blocking or damping ambient sounds can be unsafe. For example, it is dangerous for headphones to block out sounds of oncoming traffic or sirens from an approaching ambulance. Moreover, conventional headphones that fit in the ear canal are unsanitary.

It is therefore desirable to provide one or more earpieces that allow a user to enjoy a high-quality audio reproduction while, at the same time, enabling the user to hear important ambient sounds. It is further desirable to provide earpieces that are sanitary. It is also desirable to provide earpieces that provide sound that is customizable with an application or other software, and that can also compensate for hearing loss deficiencies, in addition to providing more optimal audio.

SUMMARY OF THE INVENTION

An earpiece with multiple speaker drivers, one for bone conduction and one for air conduction, in accordance with an embodiment of the present invention is wearable behind and around a user's ear. The earpiece is designed to be connected to an electronic device (such as a media player) so that a user can listen with the earpiece to an audio signal that is output from the electronic device. The connection between the earpiece and the electronic device may be wired or wireless.

The earpiece comprises a first assembly that is configured to be positioned behind or above a user's ear to provide bone conduction for low frequencies behind the user's ear, a second assembly that is configured to be positioned away from the first assembly when worn such as in proximity to the ear canal at a location between the user's crus (root) of the helix and the intertragal notch of the user's ear, to provide air conduction for high frequencies of an audio signal, and a malleable tubing, connecting the first and second assemblies, that allows the first and second assemblies to be adjusted to fit on an individual user's ear with the first and second assemblies in the desired positions about the ear. In embodiments, the first and/or second assemblies may be at least partially recessed within the malleable tubing.

In embodiments, the first assembly comprises: (i) a first speaker driver (or more than one speaker driver) that reproduces a first range of frequencies of a received audio signal that are below a first predetermined value using bone conduction of sound; (ii) a digital signal processor or passive crossover having an audio input for inputting the received audio signal to be reproduced by the earpiece, a first audio output to output a first part of the audio signal to the first speaker driver that is operatively connected to the digital signal processor or passive crossover, and a second audio output to output a second part of the audio signal to a second speaker driver that uses air conduction; and (iii) a power input or a power source for powering the earpiece. In embodiments, the first predetermined value may be in the range of 1 kHz to 6 kHz, in the range of 4 kHz to 5 kHz, or in the range of 1 kHz to 2 kHz, to name a few.

In embodiments of the present invention, the second assembly comprises a second speaker driver or more than one speaker drivers electrically connected to the first assembly to receive the second part of the audio signal and to reproduce a second range of frequencies that are above a second predetermined value which is the same as or greater than the first predetermined value using air conduction of sound. In alternative embodiments, the second predetermined value is below the first predetermined value such that some frequencies are reproduced by both first and second speaker drivers. The frequencies at the first predetermined value may be reproduced by either the first or second speaker drivers. In embodiments, the second speaker driver may be either unidirectional or omnidirectional.

In embodiments, a malleable tubing containing a conductive element that connects the first assembly and the second assembly is configured to be sufficiently flexible so as to be adjustable by the user to wrap around the back of the user's ear and have a sufficient stiffness in order to maintain the shape to which the user has adjusted it to hold the earpiece in place on the user's ear with the first assembly positioned behind the user's ear and the second assembly positioned away from the first assembly and in proximity to the ear canal, for example, at a location between the user's crus (root) of the helix and the intertragal notch of the user's ear. In embodiments, the malleable tubing curves around and above the user's ear and then descends to a position above the ear canal.

In embodiments, the earpiece may further comprise a microphone or microphones for a user to communicate with or via the electronic device. The microphone may be part of the first assembly or the second assembly or both, or, alternatively, either air conduction (treble) speaker driver or the bone conduction (bass) driver may become a microphone by reversing its audio to be output from the respective speaker driver to the digital signal processor (instead of audio being input from the digital signal processor to the respective speaker driver). For example, the air conduction (treble) driver may also provide the microphone capability or the bone conduction driver may provide that capability. In embodiments, microphones may be provided at both the first and second assemblies. In embodiments, a microphone may be positioned along a section of the malleable tubing away from the first and second assemblies.

In wireless embodiments, two earpieces may be provided and connected wirelessly to form a set of earpieces for the right and left ears of a user.

In wired embodiments, two earpieces may be provided and a second malleable tubing, which may be an additional segment of the first malleable tubing or a different type of malleable tubing, is connected to each of the two earpieces such that the second malleable tubing is electrically connected via a first electrical connector at a first end of the second malleable tubing to a first earpiece and a second electrical connector at a second end of the second malleable tubing to a second earpiece.

In embodiments, in addition to providing a comfortable fit, the malleable tubing is also capable of being reshaped or retractable into a non-earpiece shape for easy storage or for wearing by the user. For example, an earpiece may be reshaped as a bracelet or a pair of right and left earpieces may be reshaped into a necklace when the earpiece(s) are not in use for listening to audio or for audio communication.

In embodiments, one or more of the earpieces may be connected to eyeglasses, 3D or virtual reality (VR) glasses, virtual wearable technology, goggles, or a headset (collectively "VR glasses") with a connector in a manner that secures the earpieces in place on the user's ear when the earpieces are worn. In embodiments, the connector to connect an earpiece to the eyeglasses is mounted to the earpiece.

In embodiments, one or more of the earpieces may be embedded within the eyeglasses.

In embodiments, at least the first speaker driver of an earpiece may be embedded within the eyeglasses. The first speaker driver (e.g., the bass driver(s)) may be embedded within a side of the eyeglasses or in a strap connected thereto to position the first speaker driver behind the user's ear to provide the first range of frequencies via bone conduction, and the second speaker driver (e.g., the treble driver(s)) to reproduce the second range of frequencies that is configured to be positioned in front of the user's ear in proximity to the ear canal. A Bone Conducting microphone (BC mic) or an Acoustic Conducting microphone (AC mic) may also be added to both assemblies.

In embodiments, at least the first speaker driver of an earpiece may be embedded into a pair of VR glasses. The first speaker driver (e.g., the bass drivers) may be embedded within a side of the VR glasses, or on a strap connected thereto to position the first speaker driver behind the user's ear to provide the first range of frequencies via bone conduction, and the second speaker driver (e.g., the treble drivers) to reproduce the second range of frequencies is configured to be positioned in front of the user's ear in proximity to the ear canal.

In certain embodiments of the earpiece, eyeglasses, or VR glasses, the second speaker driver may be configured to enable placement in the ear canal rather than outside the ear canal.

BRIEF DESCRIPTION OF THE DRAWINGS

Exemplary embodiments of the present invention will be described with reference to the accompanying figures, wherein:

FIG. 6 is a perspective view of a pair of VR glasses in which earpieces in accordance with an exemplary embodiment of the present invention each have a bass driver that uses bone conduction embedded within the pair of VR glasses and a treble driver.

DETAILED DESCRIPTION OF THE INVENTION

Figure 7:
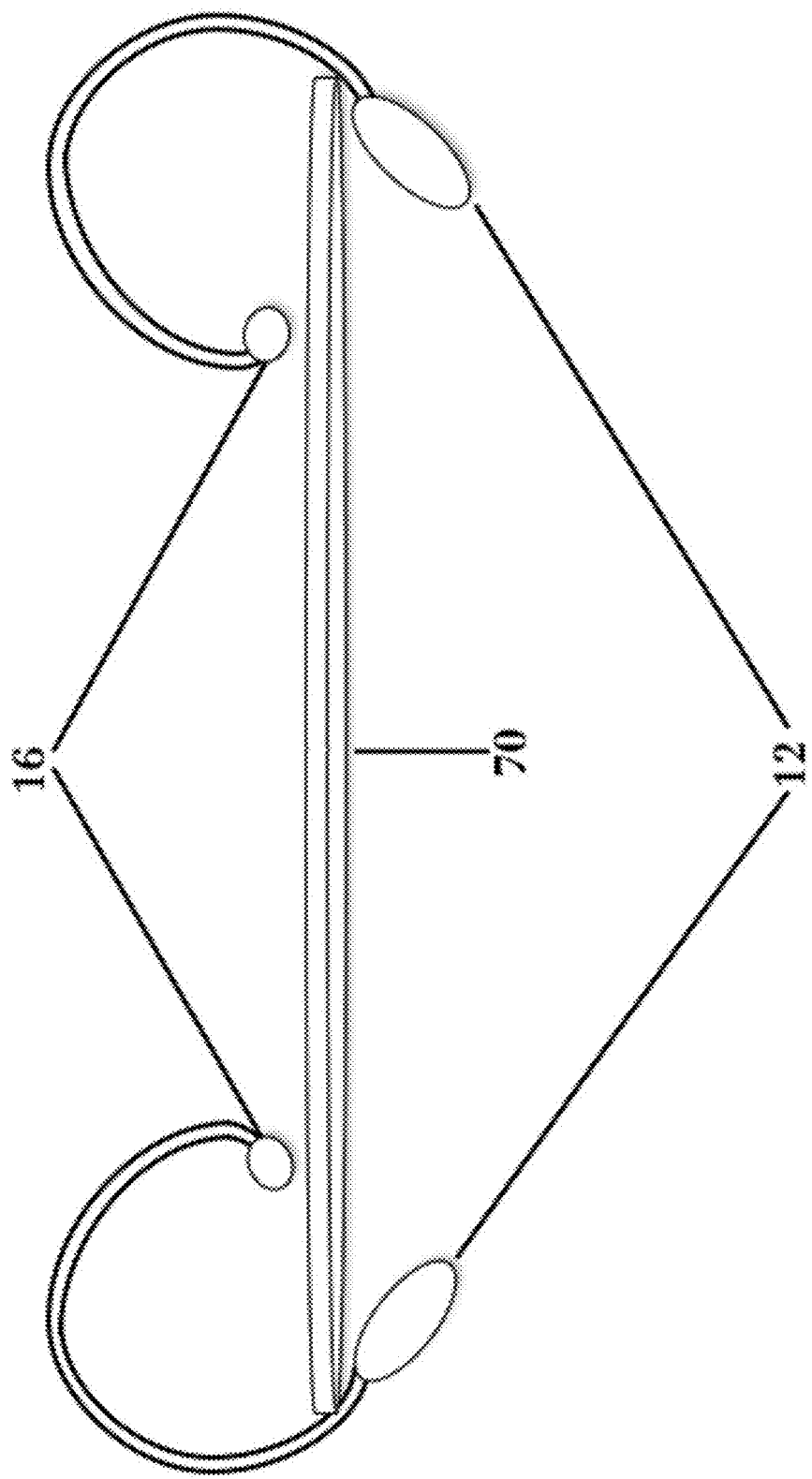
FIG. 7 is a perspective view of a headphones where the two earpieces in accordance with an exemplary embodiment of the present invention are attached to headphones.

The present invention generally relates to an earpiece with multiple speaker drivers that provides high quality audio reproduction of audio output by an electronic device. The earpiece may be used with one or more different types of electronic devices that output audio. Examples of such electronic devices are a smartphone, a television, a stereo system, an Apple iPad or Apple TV from Apple Inc. of Cupertino, Calif., a portable audio system, a tablet computer, a laptop computer, a desktop computer, a wearable computer, a cell phone, a personal data assistant, or a specially-configured terminal, any telecommunications device, or VR glasses, to name a few. The earpiece may be used to supply audio to a single ear. In embodiments, two earpieces may be paired and used as headphones. In embodiments, there is a wired connection between the right and left earpieces, such as shown in FIG. 7, to form headphones 70. In embodiments, the right and left earpieces are connected wirelessly.

Figure 1A:
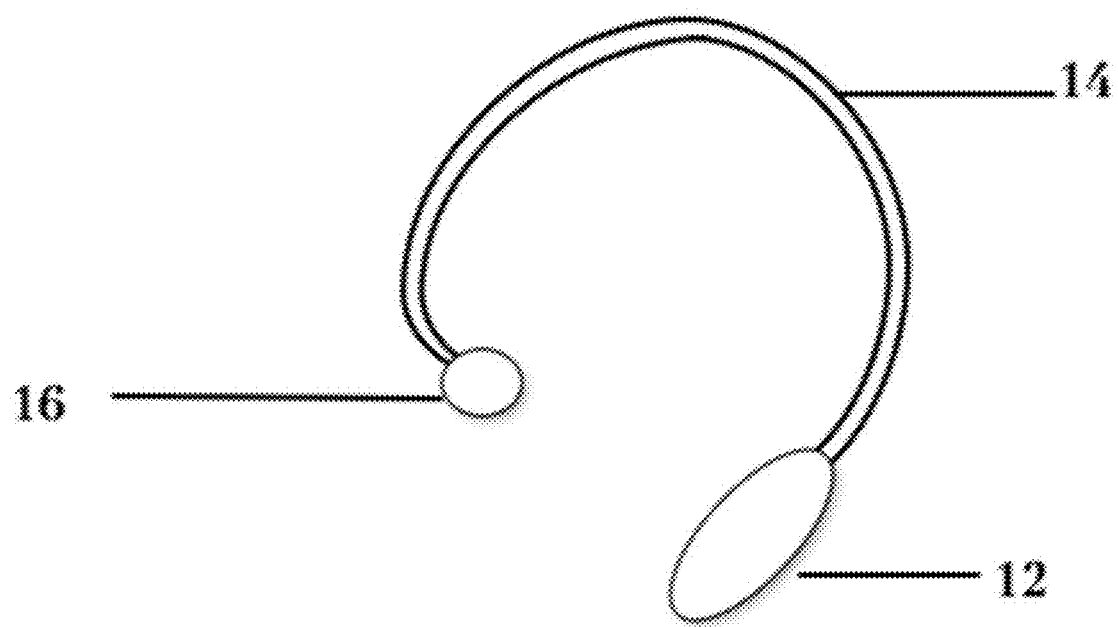
FIG. 1A is a perspective view of a malleable earpiece in accordance with an exemplary embodiment of the present invention after it is bent to fit around and behind the ear of a user.
Figure 2A:
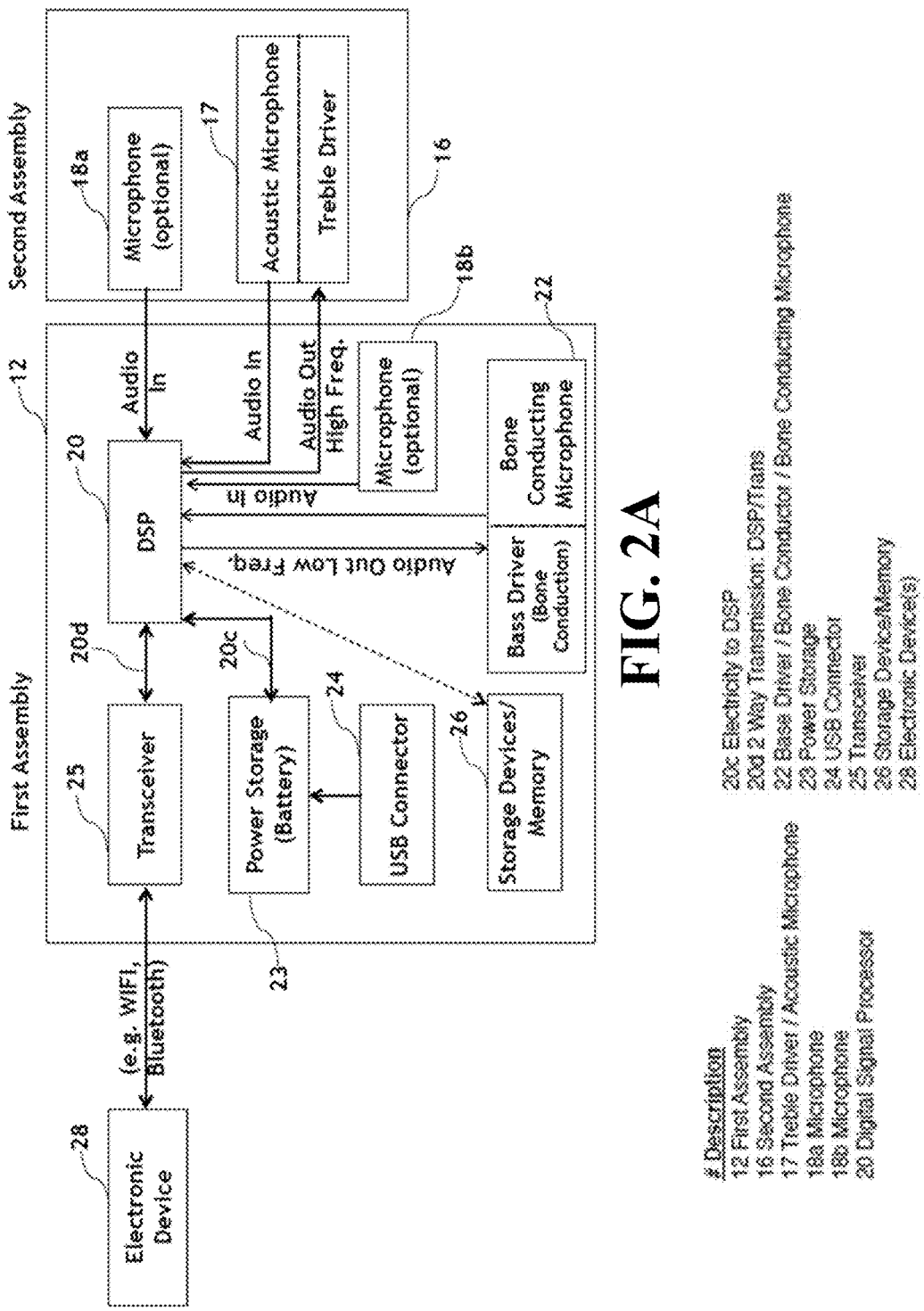
FIG. 2A is a schematic diagram showing the components of the earpiece of FIG. 1 in accordance with an exemplary embodiment of the present invention where the earpiece is wireless.
Figure 2B:
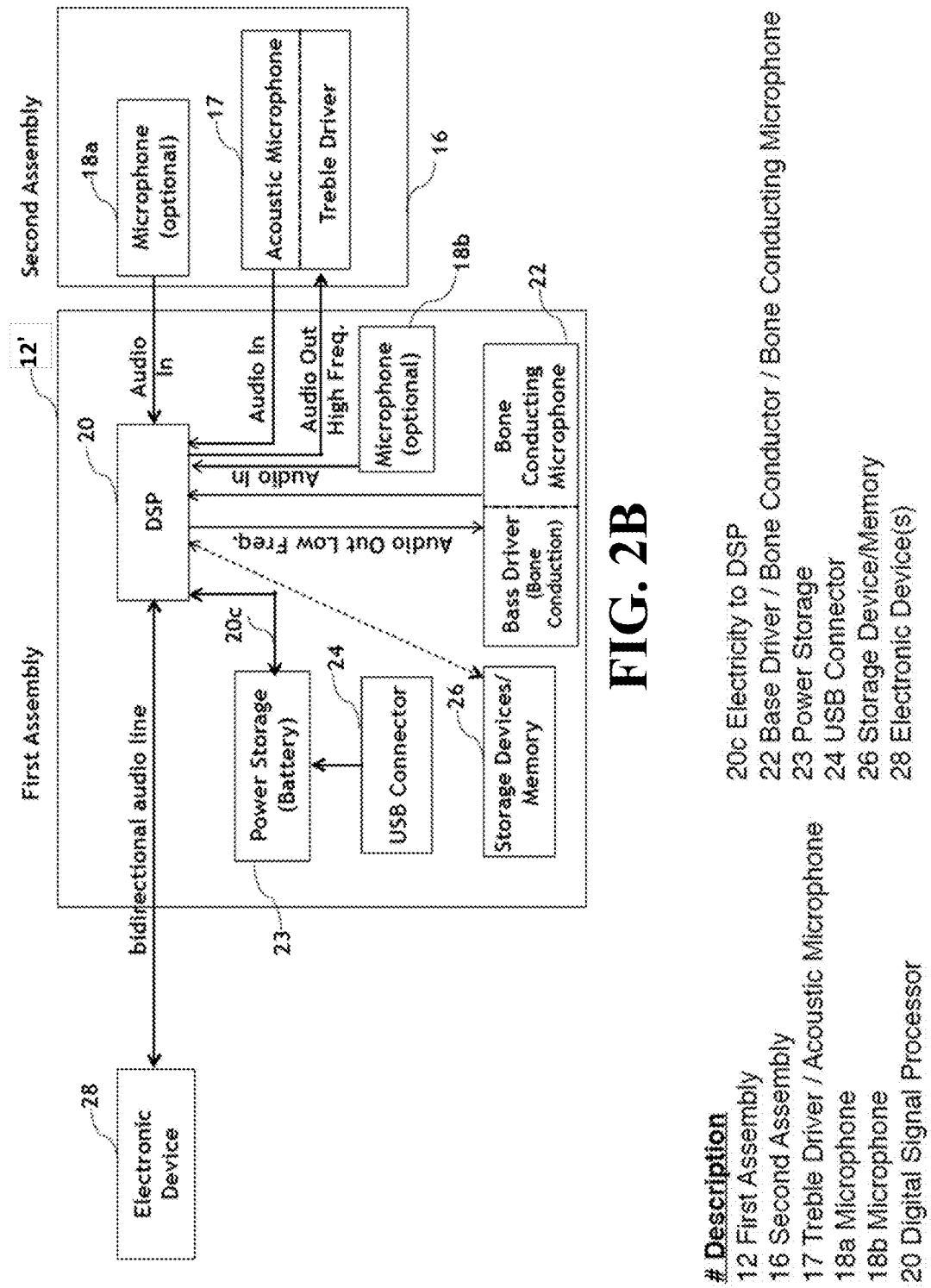
FIG. 2B is a schematic diagram showing the components of the earpiece of FIG. 1 in accordance with an exemplary embodiment of the present invention where the earpiece is connected to an electronic device with a wired connection.

FIG. 1A shows an example of an earpiece 10 in accordance with an embodiment of the present invention that has been shaped by a first user to be worn behind the user's ear. (Earpiece 10 may be bent to a different shape when not in use as described below with respect to FIG. 3.) Referring to FIGS. 1A, 2A, and 2B, earpiece 10 includes a first assembly 12, near a first end of earpiece 10, that has components for operating earpiece 10 and a first speaker driver (or drivers), including bone conducting bass driver 22, for reproducing the low frequencies of the received audio signal. A second assembly 16, mounted near a second end of earpiece 10 has a second speaker driver (or drivers), including an acoustic treble driver 17, for reproducing the high frequencies of the received audio signal. For example, the first driver may be used to reproduce frequencies up to a first predetermined value, such as where the first predetermined value is within a range of 1 kHz to 2 kHz, or 1 kHz to 6 kHz (e.g., frequencies to be reproduced by bass driver 22 would be within ranges of 50 Hz to 1 kHz or 5 kHz, 100 Hz to 1 kHz or 5 kHz, 200 Hz to 1 kHz or 6 kHz) and the second driver may be used to reproduce frequencies above the first predetermined value 1 to 5 kHz up to around 20 kHz or higher (e.g., ranges of 4 KHz to 20 kHz, or 6 kHz to 20 kHz). In embodiments, the second speaker driver may be used to reproduce frequencies above a second predetermined value which is at or above the first predetermined value. Typically, the second predetermined value will be at or around the first predetermined value. In an alternative embodiment, the second predetermined value may be lower than the first predetermined value such that some frequencies are reproduced with both the first and second speaker drivers. The first predetermined value is just provided as an example; the first predetermined value may differ based on testing of the drivers that are used in a particular implementation.

Earpiece 10 further includes malleable tubing 14 that connects the first and second assemblies 12 and 16. Malleable tubing 14 allows the user-adjustability of earpiece 10 such that it may be shaped, such as by bending, rotating, and/or twisting, to a position that places the speaker drivers 17, 22 (shown in FIGS. 2A and 2B) at or near optimal positions on a user's ear, regardless of the size of the user's ear, and secures the earpiece in place comfortably. Malleable tubing 14 is pliable which enables the user to bend earpiece 10 to position it comfortably without completely covering the user's ear canal, thereby allowing a user to hear important ambient sounds while wearing the earpiece. The length of malleable tubing 14 used for an earpiece 10 may be varied such that earpiece 10 may be offered in different sizes, like small, medium, and large, to allow for different possible ear sizes.

Figure 1B:
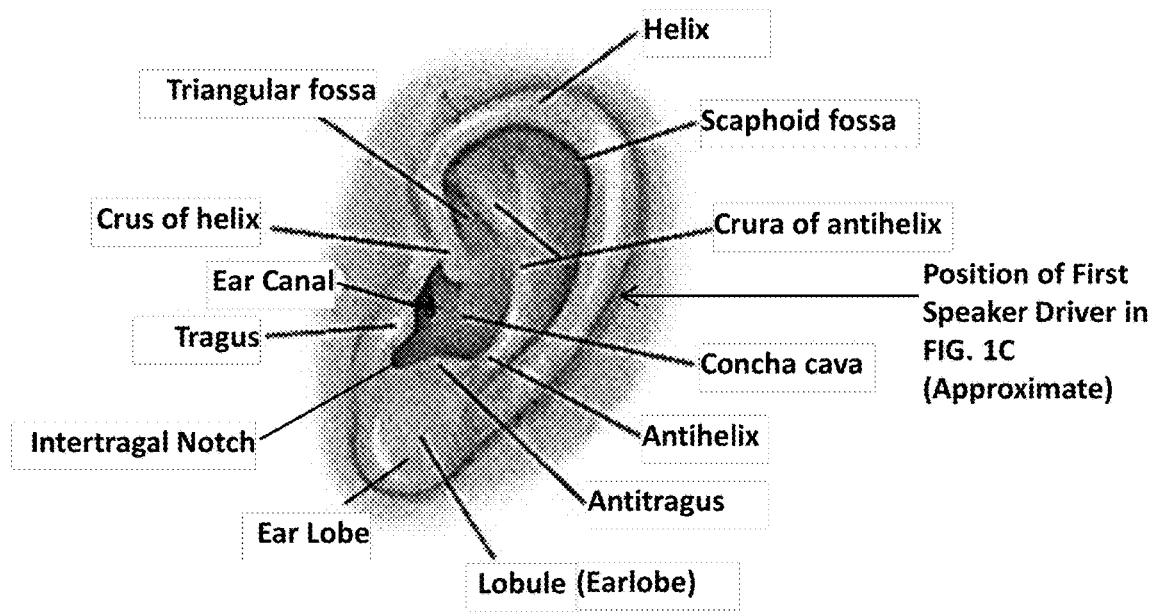
FIG. 1B is an external view of an ear on which the malleable earpiece of FIG. 1A may be worn.
Figure 1C:
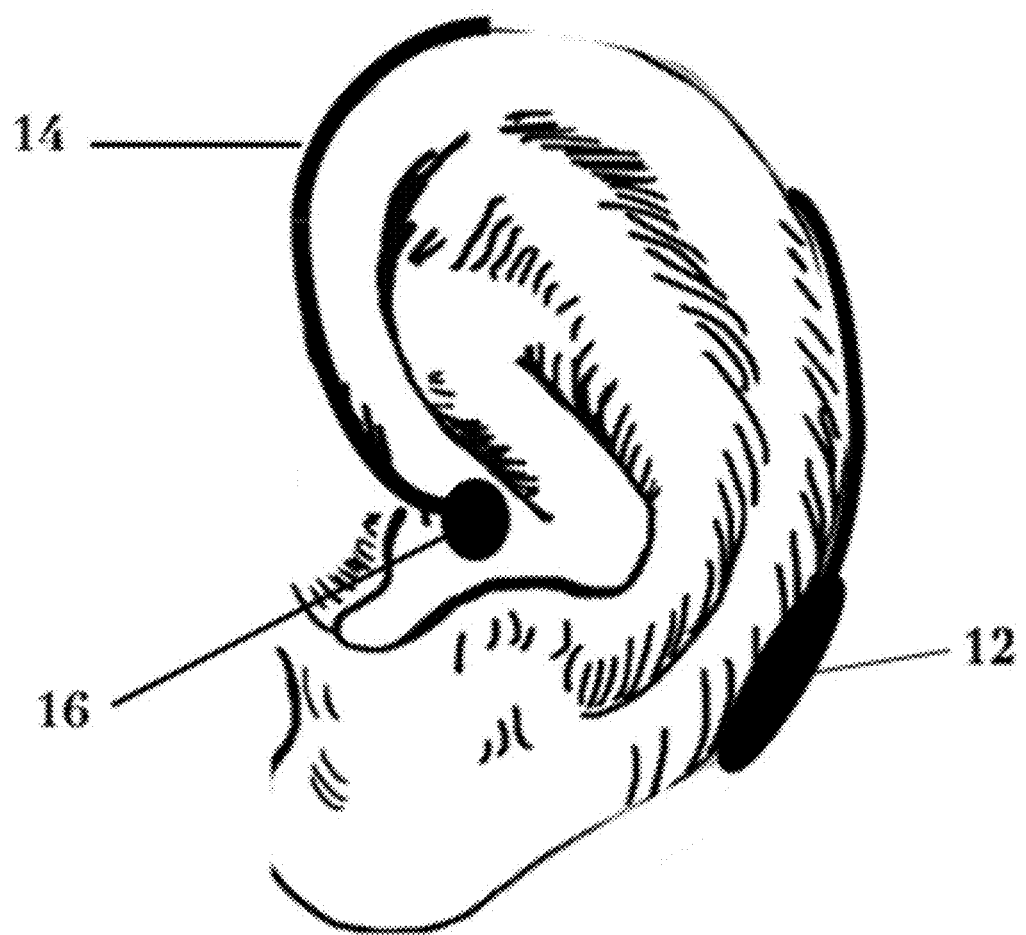
FIG. 1C shows an example of a positioning of the malleable earpiece, in accordance with an exemplary embodiment of the present invention, over the ear.

FIG. 1B shows an illustration of an ear on which earpiece 10 may be positioned. In embodiments, earpiece 10 may be multipositional to enable the earpiece 10 to be positioned differently on a user's ear based on a user's preference. FIG. 1C shows an example of a one possible positioning of earpiece 10 over the ear. In this example, first assembly 12 of earpiece 10, including a bone conduction (bass) driver (or drivers), is to be positioned behind the ear in proximity to the user's mastoid bone and against the skin to take particular advantage of bone conduction using the user's mastoid bone, which is a choice location for bone conduction. Also, in this embodiment, second assembly 16 is positioned in front of the ear in proximity to the ear canal, such as at a location between the user's crus (root) of the helix and the intertragal notch of the user's ear. Second assembly 16 may be bent inward toward the ear canal to hover over the ear canal. In embodiments, second assembly 16 is positioned within 1 cm of the outside of the user's ear canal. The positioning of the bone conduction driver behind the ear in proximity to the user's ear canal as shown in FIG. 1C improves the sound quality as compared to placing the bone conduction driver elsewhere about the ear such as near the top of the ear.

Figure 1D:
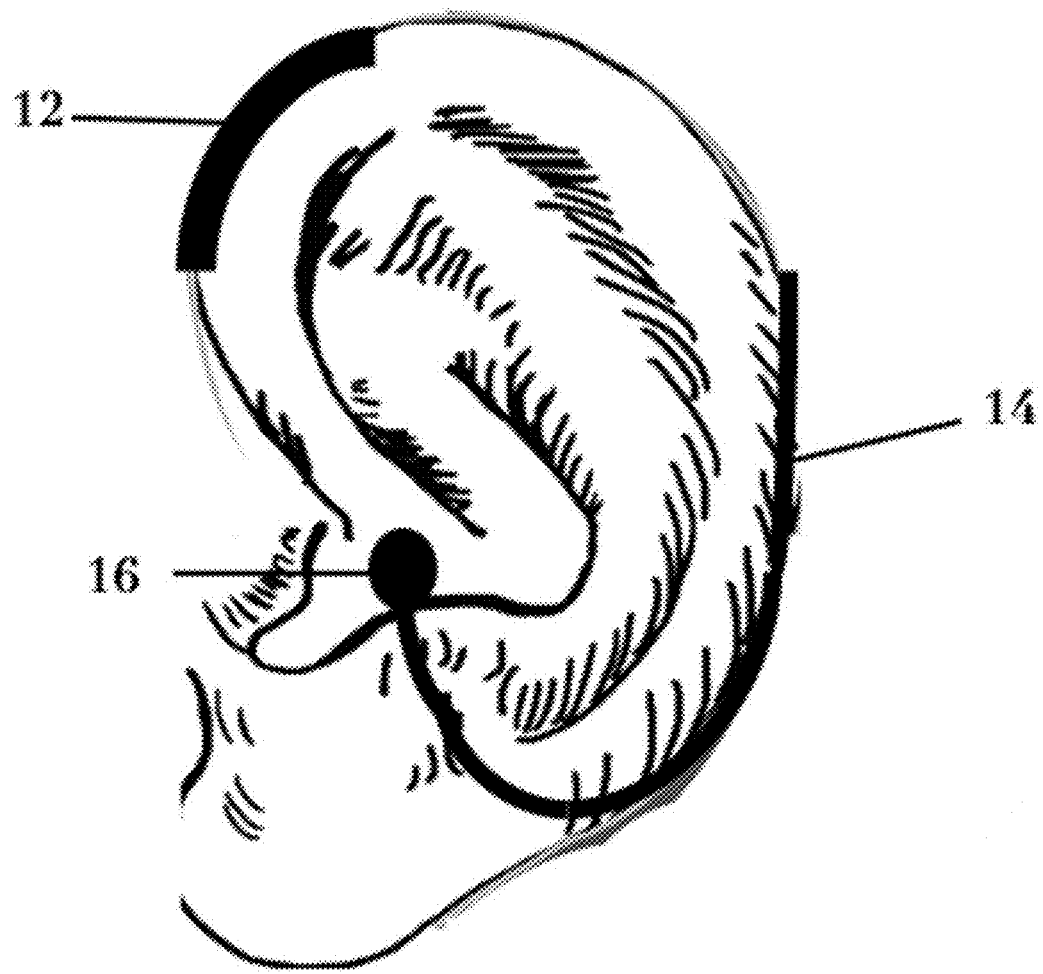
FIG. 1D shows an example of an alternative exemplary positioning of the malleable earpiece, in accordance with an exemplary embodiment of the present invention, over and under the ear.

FIG. 1D shows an another example for positioning earpiece 10 over the ear. As illustrated in FIG. 1D, first assembly 12 may be positioned toward the top of a user's ear while second assembly 16 comes down further behind the ear near the earlobe and may wrap inward over the earlobe.

Alternatively, due to the malleable tubing 14, earpiece 10 may be adjusted and positioned differently when worn on the user's ear to provide bone conduction with first assembly 12, such as through the user's mastoid process, mandible, skull sutures, temporal bone, glabella, frontal bone, the skull in toto, zygomatic arch, or trigeminal nerve, while allowing for second assembly 16 to be adjusted to a comfortable position, such as near the user's ear canal. To enable bone conduction, earpiece 10 should be positioned with the bone conduction speaker driver positioned to emit sound directly against the user's skin.

FIG. 2A illustrates exemplary electronic components of earpiece 10 in wireless communication with an electronic device 28. First assembly 12 includes a digital signal processor (DSP) 20 or passive crossover (not shown) that receives an input audio signal and digitally processes it such as with sonic enhancement, equalization, and time delay. The received audio signal is split into two parts by DSP 20 or passive crossover (which are electrically connected to speaker drivers), the first part carrying the low frequencies and the other part carrying the high frequencies. The low frequency part of the received audio signal is output from audio output 20a at DSP 20 to a bass driver (or drivers) 22 also at the first assembly 12. The DSP chip 20, in addition to providing the crossover frequency and equalization, will delay the bass driver 22 to phase align with the treble driver 17. Bass driver 22 emits sounds to be detected by a user by bone conduction, using an electro-mechanical transducer that converts the electrical signal into vibrations to transmit sound to the inner ear through bones of the skull. The high frequency part of the received audio signal is output from audio output 20b and is transmitted via a wired connection to treble driver 17 from which sound is emitted by air conduction to be heard via a user's ear canal. Treble driver (or drivers) 17 may be unidirectional such that treble driver(s) 17 should be aimed to the user's ear canal. Alternatively, speaker driver(s) 17 may be omnidirectional. In embodiments, the first predetermined value and/or the second predetermined value relating to the crossover point for the frequencies reproduced by bass driver(s) 22 and treble driver(s) 17 may be changeable using DSP 20 or a passive crossover.

One or more microphones may be included in earpiece 10 and output audio to DSP 20 or passive crossover (not shown). In embodiments, a microphone 18a may be included in first assembly 12 and/or a microphone 18b may be provided in second assembly 16. In addition to or in lieu of microphone 18a and/or microphone 18b, in embodiments, treble driver(s) 17 may also be a pick-up acoustic (AC) microphone and/or bass driver(s) 22 may also be a bone conducting microphone. In embodiments, a microphone may be positioned along a section of the malleable tubing away from the first and second assemblies. Where more than one microphone is provided, DSP 20 or passive crossover may be operatively controlled to select which audio input(s) will be used.

In addition, DSP 20 can communicate with software or a mobile application to customize a response to the user, and provide additional functionality. The customization process may include hearing testing to optimize the response and contour of earpiece 10 to a specific user, especially for the hearing impaired. The test procedures may incorporate head-related transfer function (HRTF) functionality for this purpose. The software or mobile application will typically reside on a cell phone, tablet or other computing device.

Because treble driver 17 may not be optimally positioned in the ear canal, it is possible that the audio from treble driver 17 is undesirably audible to individuals in the vicinity of the user. Such individuals may be disturbed by the noise or the user may wish to have privacy. A user-controlled switch (e.g., manual, electronic, or implemented in software) may therefore be optionally provided either at electronic device 28, at earpiece 10, or via remote control to turn off treble driver 17 when the user desires. Alternatively, second assembly 16 can be inserted at least partially into the user's ear canal to lessen the noise.

In the embodiment of FIG. 2A, earpiece 10 has a wireless connection point so that it can be paired wirelessly to an electronic device 28 that supplies the audio via a wireless connection, such as with Bluetooth, Bluetooth Low Energy, Wi-Fi, radio, infrared connections, and/or ZigBee communication protocols, to name a few. For a wireless earpiece, the audio signal is received from an electronic device 28 via a receiver or transceiver 25 that may be included at first assembly 12 or elsewhere at earpiece 10. Receiver or transceiver 25 is in communication with DSP 20. Power for earpiece 10 may be stored at a power source, such as power storage device 23 at first assembly 12 or elsewhere at earpiece 10 and supplied to DSP 20 via 20c. Power storage device 23 may be, for example, a rechargeable battery (e.g., a button battery) that is periodically charged, for example, by connection to a power source via a power input such as a USB port 24 or via inductive charging such as by being placed on a wireless charging pad, solar charger, or alternative energy source technology. The charge typically enables several hours of continuous operation of the earpiece 10 before a recharge is necessary.

In the embodiment of FIG. 2B, where like parts are shown with the same element numbers as in FIG. 2A, earpiece 10 has a wired connection to electronic device 28 that supplies the audio signal and that may also be used to power earpiece 10. Thus, first assembly 12' of the wired version of earpiece 10 may be differently configured from first assembly 12 of FIG. 2A. Wired connections may be provided through a power input such as a hard-wired connection or via a cable connected to electronic device 28 and an audio jack or other port on earpiece 10, such as a USB port 24. The wired version of earpiece 10 may or may not have its own power storage 23, such as in first assembly 12', to supply power to DSP 20 via 20c. (It should be understood that general references to first assembly 12 throughout this specification, other than when referring specifically to the wireless embodiment of FIG. 2A, refer generally to a first assembly that could be a first assembly 12 for a wireless earpiece or a first assembly 12' for an earpiece with a wired connection.) In embodiments, an earpiece 10 may also be configured for both wired and wireless connectivity, in which case first assembly 12' would have a transceiver.

In embodiments as shown in FIGS. 2A and 2B, DSP 20 (or passive crossover) may also include one or more audio-in connections for the one or more microphones that may be provided in first assembly 12/12' and/or second assembly 16 (such as microphones 18a, 18b or microphones included in the treble and bass drivers 17, 22). Microphone 18a, which may operate, for example, by air conduction, or an acoustic microphone included with treble driver 17 allows a user to communicate with or via electronic device 28 with which earpiece 10 operates. In embodiments, microphone 18b, which may be situated in first assembly 12 or 12', or a microphone included with bass driver 22 may operate, for example, via bone conduction. Audio from one or more of the microphones is sent to electronic device 28 via transceiver 25 or a separate transmitter (for a wireless connection) as shown in FIG. 2A or via a wired connection as shown in FIG. 2B.

In embodiments, earpiece 10 may include one or more non-transitory memory storage devices 26 operatively connected to DSP 20 (or passive crossover) for storing and/or buffering audio to be played back or transmitted to electronic device 28. The one or more non-transitory memory storage devices may be, for example, flash memory, and/or other removable memory such as an SD card, a memory card, a flash memory card, a flash memory stick, and/or cloud memory. For example, a user may listen to songs that are downloaded via a WiFi connection.

In embodiments, malleable tubing 14 is provided to allow for a user to adjust earpiece 10 behind the back of the user's ear to properly position the bass and treble drivers 22, and 17, regardless of a user's ear size or anatomy. (In embodiments, earpieces 10 may be provided in multiple sizes, each having a different length of tubing 14). Thus, tubing 14 enables (i) a positioning of bass driver 22 that uses mastoid bone conduction behind the user's ear so that it touches the skin to vibrate against the inner bone and (ii) the desired positioning of treble driver 16 in front of the user's ear. While positioning to use the mastoid process for bone conduction is preferred, bass driver 22 may alternatively be positioned on the user's ear for bone conduction that utilizes one or more of the mandible, skull sutures, temporal bone, glabella, frontal bone, the skull in toto, zygomatic arch or trigeminal nerve of the user. Malleable tubing 14 may be formed from one or more materials, such as a metal (such as copper, aluminum, stainless steel, steel, tin, brass, zinc, or platinum, to name a few) or combination of metals (such as a combination of spring steel, copper, stainless steel and beryllium, to name a few) or from a plastic composite, that have sufficient flexibility, such that a user may adjust of the shape of tubing 14 to a particular shape, but that are sufficiently stiff or rigid such that the shape is maintained unless the user exerts a force to reshape the tubing. As another example, malleable tubing 14 may be formed from a material having elastic properties such as a thermoplastic elastomer (TPE) and more specifically an extruded TPE, which include copolymers or a physical mix of polymers (usually a plastic and a rubber) which consists of materials with both thermoplastic and elastomeric properties. Reinforcement fibers can also be used to add strength to the tubing 14. Malleable tubing 14 may also be formed from one or more other materials, such as, for example, vinyl or PVC tubing or any new alternative green technologies. In embodiments, malleable tubing 14 should have a hollow passageway between the top and bottom such that wiring/cabling, which may be insulated, can be run within tubing 14 to connect the first and second assemblies 12, 16.

Figure 3A:
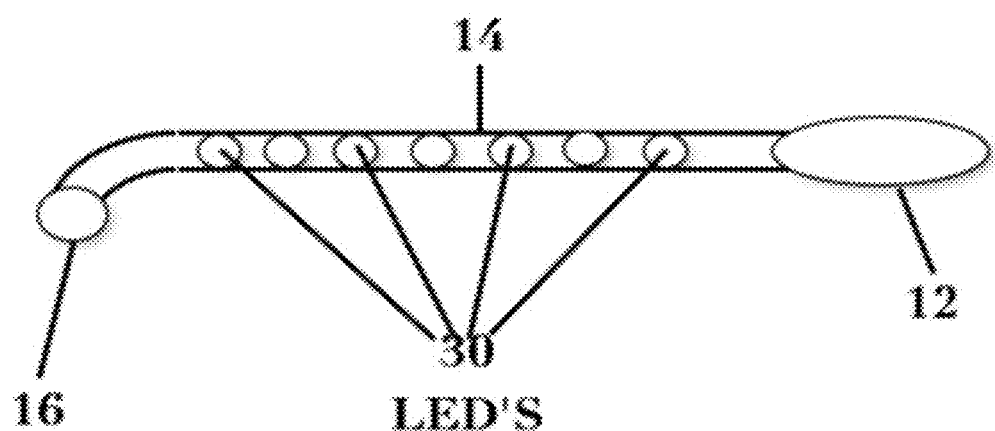
FIG. 3A is a perspective view of the earpiece of FIG. 1 in accordance with an exemplary embodiment of the present invention when it stretched to a fully extended position.

When earpiece 10 is not in use, the malleability of the earpiece also enables it to be more conveniently and securely stored by the user. For example, FIG. 3A shows earpiece 10 fully extended. FIG. 3A also shows possible decorative options, e.g. LED lights 30 inside malleable tubing 14. Earpiece 10 could then be stored in an inner pocket of a jacket.

Figure 3B:
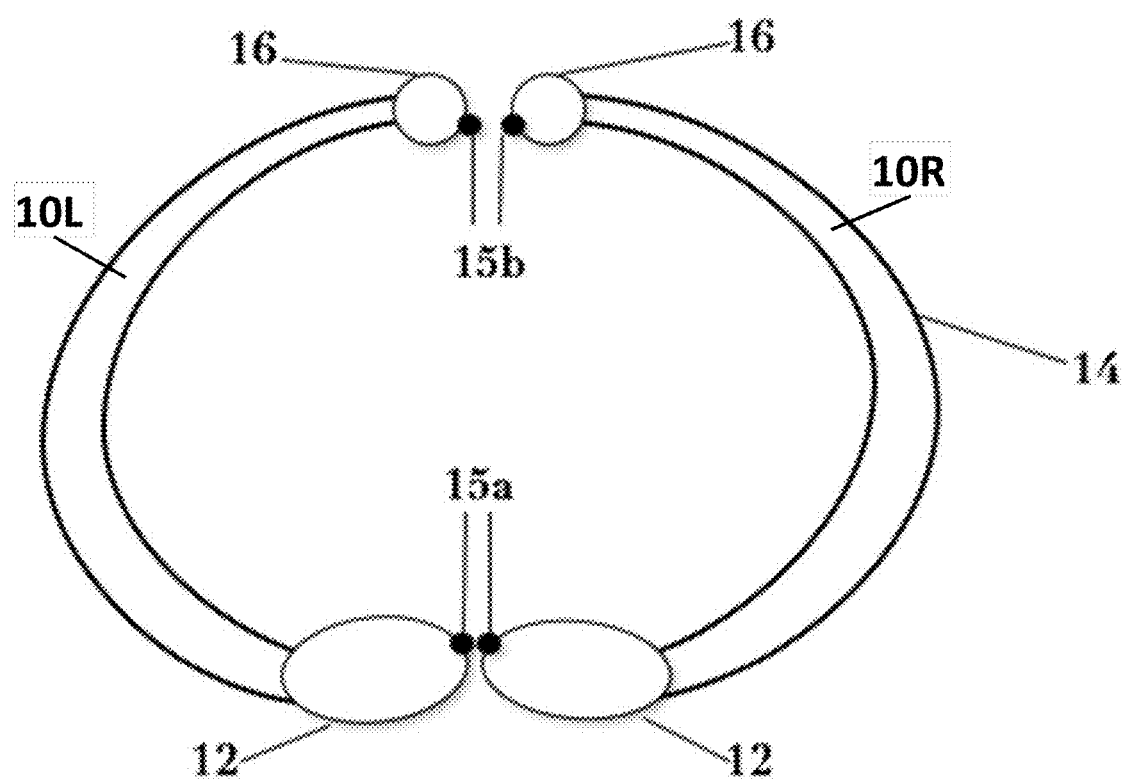
FIG. 3B is a perspective view of a pair of right and left earpieces in accordance with an exemplary embodiment of the present invention connected in a first configuration to form a necklace.
Figure 3C:
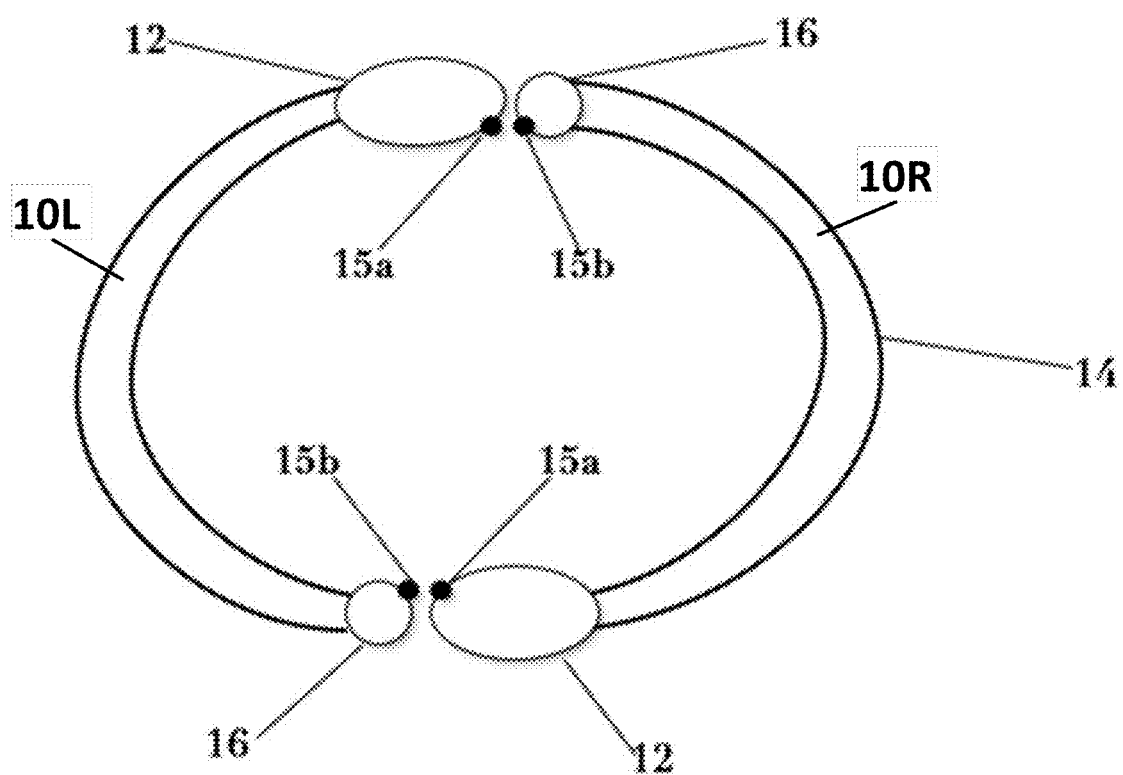
FIG. 3C is a perspective view of a pair of right and left earpieces in accordance with an exemplary embodiment of the present invention connected in a second configuration to form a necklace.

FIG. 3B shows how tubing 14 on a pair of right and left earpieces 10R, 10L may be adjusted in a circle to be worn around a user's neck as a necklace, such as a choker, among other types of necklaces. Connectors 15a, 15b, which may be one of various types of connectors, clasps, or fasteners, may be provided at each end of earpiece 10, for example attached to first and second assemblies 12, 16 to quickly and securely connect together the two earpieces 10R and 10L together. FIG. 3B shows one possible configuration for forming the necklace in which respective first assemblies 12 on each earpiece 10R and 10L are connected and respective second assemblies 16 on each earpiece 10R and 10L are connected. FIG. 3C shows a different possible configuration for forming the necklace in which a first assembly 12 on each of earpieces 10R and 10L is connected to a second assembly 16 on the other of earpieces 10R and 10L. In another configuration (not shown), earpieces 10R and 10L may only be connected on one end to form a partial choker that extends around only a portion of the user's neck. Alternatively, another piece of malleable tubing may be provided with connectors and inserted between the ends of earpieces to expand the necklace for users who seek a necklace that is longer than the combined length of earpieces 10R, 10L.

Figure 3D:
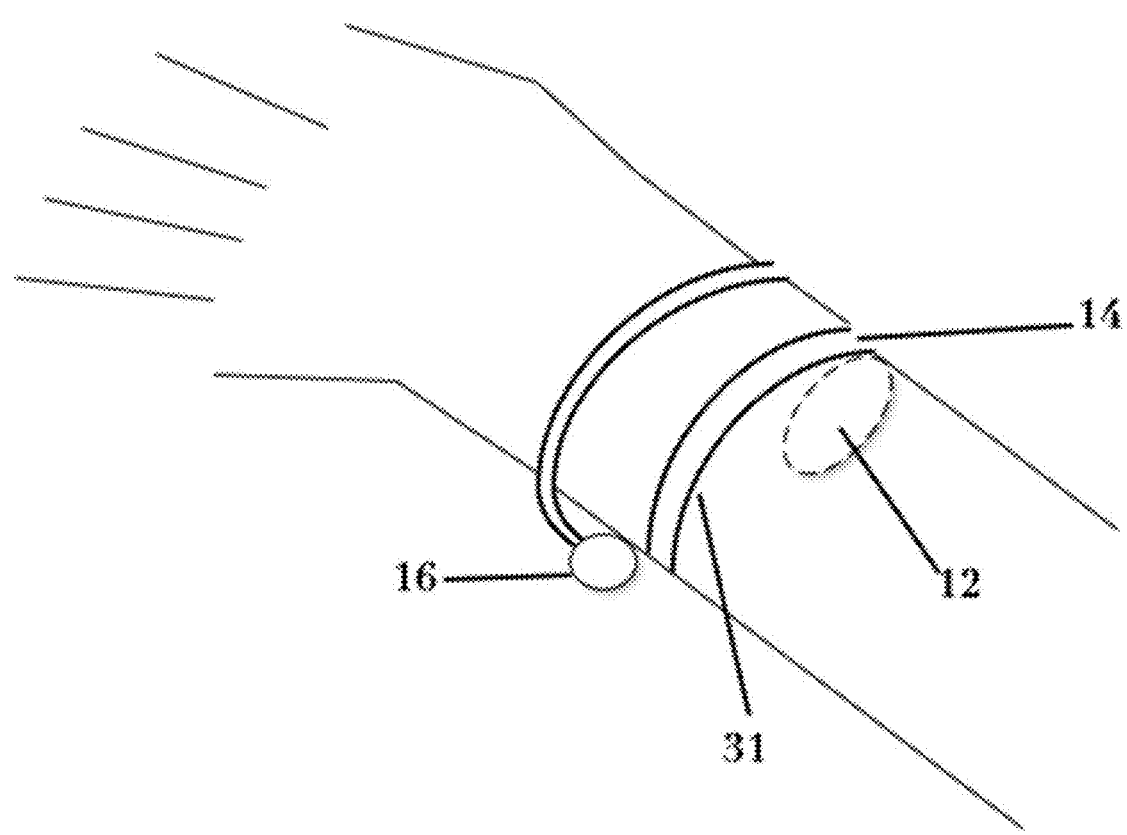
FIG. 3D is a perspective view of the earpiece of FIG. 1 in accordance with an exemplary embodiment of the present invention when it is bent to form a bracelet.

FIG. 3D shows how tubing 14 may be bent by a user into a bracelet shape to be worn as a bracelet 31 by a user when not in use. In this configuration, earpiece 10 may also be used to transmit audio through the first assembly 12, which uses bone conduction, such that the user's finger can be placed near the ear canal to conduct phone conversations (a finger phone), or other audio communications.

When the earpieces are shaped into a necklace or bracelet shape or some other shape and worn by the user, it is less likely to be misplaced or lost when not in use. Earpiece 10 can alternatively be folded so that it is not bulky to carry such as in a pocket or a purse. The optional physical connections of earpieces 10R and 10L also allow for right and left earpieces to be stored together.

Figure 3E:
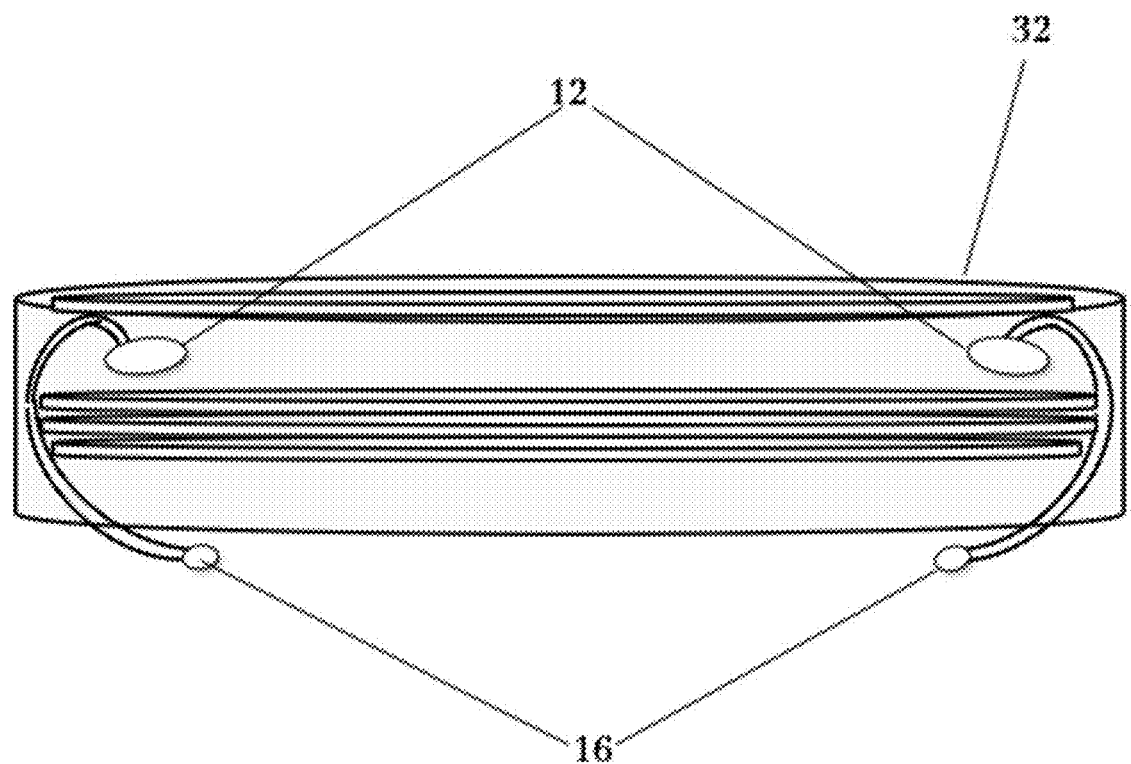
FIG. 3E is a perspective view of the earpiece of FIG. 1 in accordance with an exemplary embodiment of the present invention incorporated in a headband.

FIG. 3E shows another embodiment in which earpiece 10 may be incorporated in a headband 32.

In wired embodiments, where two earpieces 10R and 10L are connected with a wired connection, an additional segment of the malleable tubing, or a retractable wire or folding frame, may be connected to each of the two earpieces 10R, 10L such that the additional segment is electrically connected via a first electrical connector at a first end of the additional segment of malleable tubing (or a retractable wire or folding frame) to the first earpiece and a second electrical connector at a second end of the additional segment of malleable tubing (or a retractable wire or folding frame) to the second earpiece.

Figure 4A:
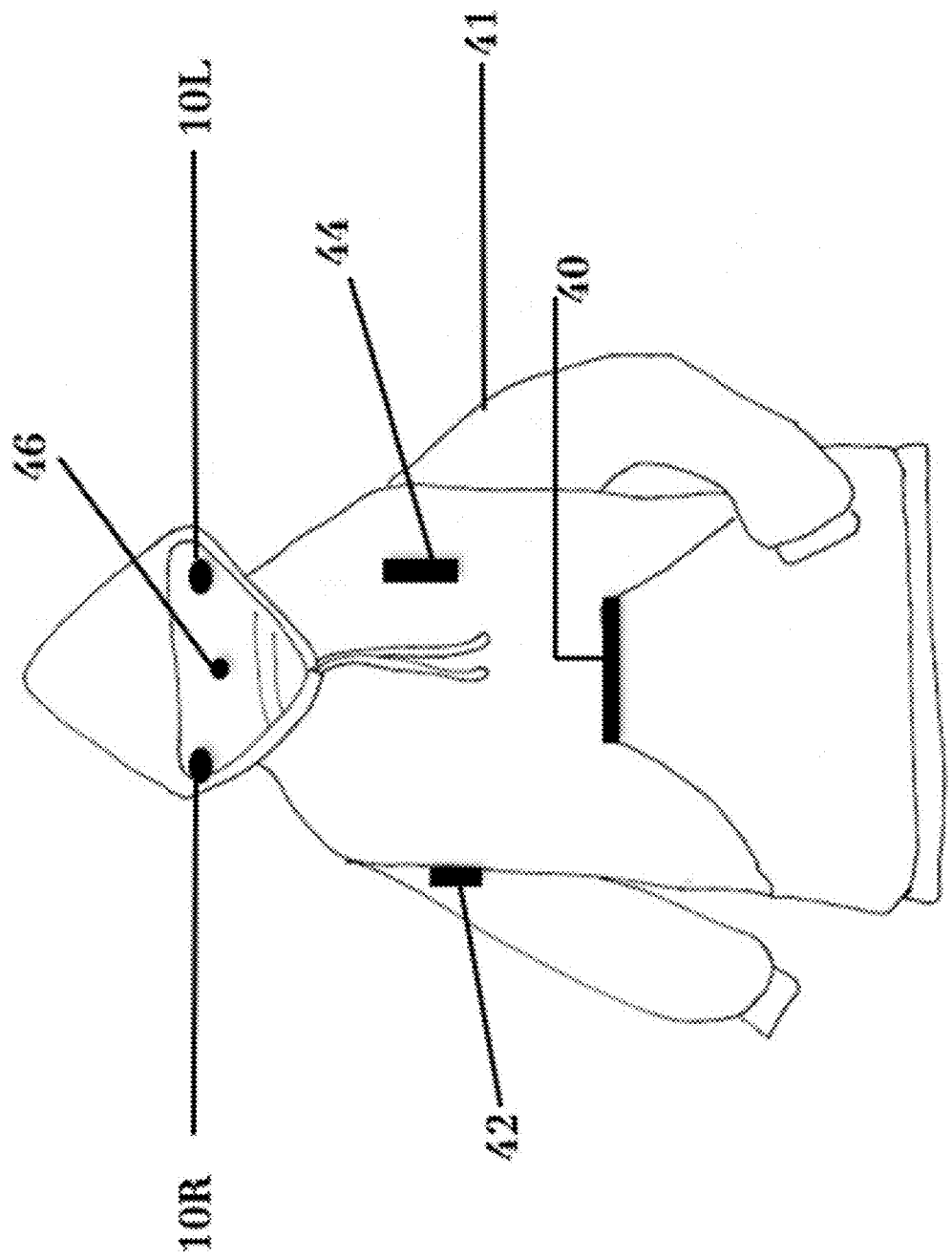
FIG. 4A is a front view of a hoodie through which malleable tubing to connect right and left earpieces in a wired configuration in accordance with an exemplary embodiment of the present invention may be threaded.
Figure 4B:
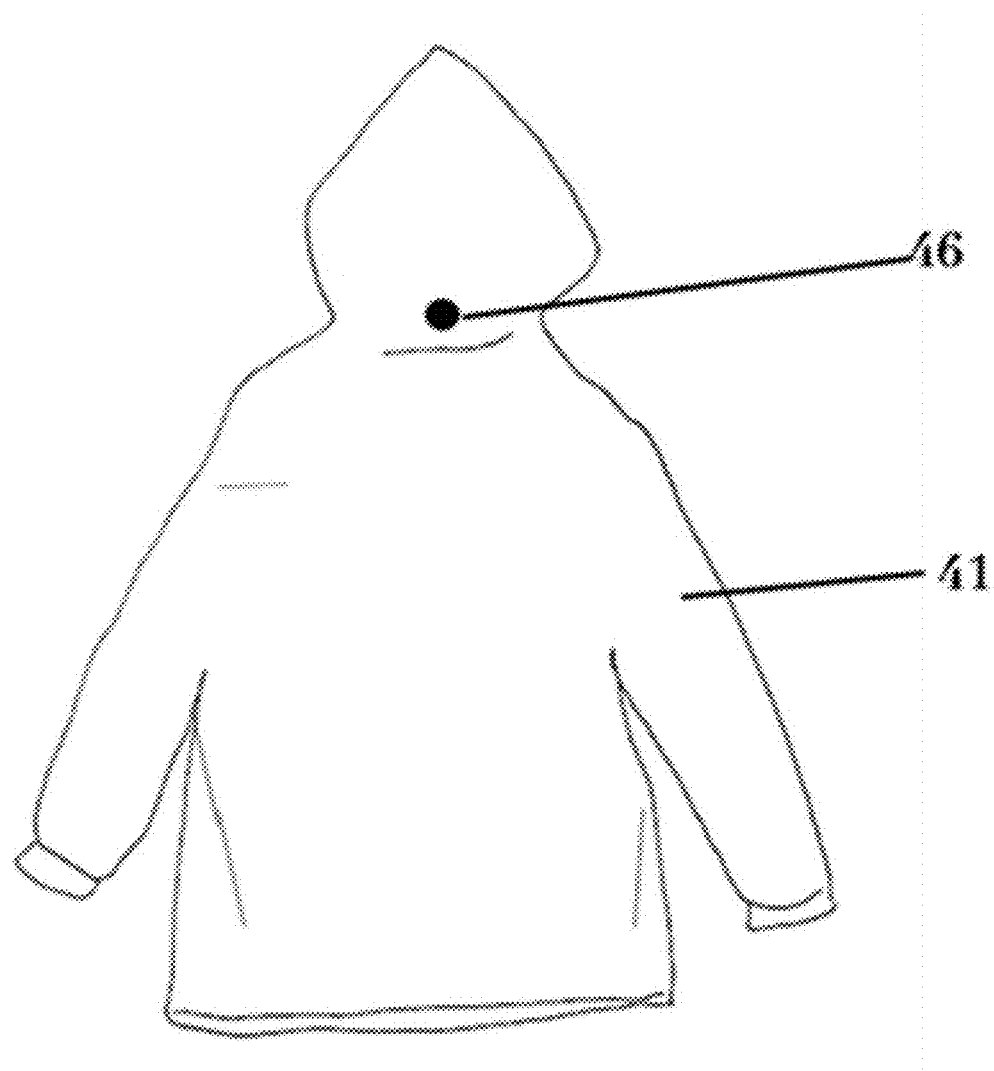
FIG. 4B is a back view of the hoodie shown in FIG. 4A in accordance with an exemplary embodiment of the present invention.

As shown in FIG. 4A, where earpieces 10 are connected together in a wired configuration, it is also possible to thread the additional segment 40 of malleable tubing 14 through a user's hoodie 41 to connect the right and left earpieces (right 10R and left 10L) so that the wiring or tubing connecting right and left earpieces 10 is minimally exposed. As shown in FIG. 4B, additional segment 40 may have an electrical contact point at location 46 on the hoodie 41 behind the user's head for easy connection and separation of earpieces 10R and 10L from the hoodie 41. Pockets 42, 44 can be included in a hoodie 41 to store right and left earpieces 10R, 10L, respectively.

In either the wireless embodiment or the wired embodiment, software or an application may be provided on a cell phone, tablet, smart TV, gaming console, or other computing device that would allow the user to control the AC and BC drivers to customize the sound.

Malleable tubing 14 may also be covered with designs or patterns, with a display light and/or panel (e.g., an LED display) that may be used to show device status (e.g., on/off, volume, to name a few) or may just be decorative, or with small lights such as a strip of LED lights 30 as shown, for example, in FIG. 3A to enhance the appearance of the tubing as desired by users. Tubing 14 may also be covered with covers to provide additional ornamentation. First and second assemblies may also be adorned with designs, patterns, or other ornamentation for improved aesthetics. A flexible cushioned cover may be placed around tubing 14, outside of the locations in which first and second assemblies 12, 16 are located.

Earpiece 10 may be used to listen to diverse types of audio, such as phone calls, music files, television, videos or any streamed audio. Additionally, earpiece 10 may be used to play relaxing, healing or meditative sounds such as solfeggio frequencies, which are believed by some, although not proven, to have healing powers, and earth sounds (e.g., sounds of rain or ocean waves, to name a few). In embodiments, solfeggio frequencies may include one or more of the following frequencies: 63 Hz, 174 Hz, 285 Hz, 396 Hz, 417 Hz, 528 Hz, 639 Hz, 741 Hz, 852 Hz, 963 Hz, and 1074 Hz. Without being bound by theory, some of the benefits of listening to the solfeggio frequencies are believed to be: 174 Hz (reduce pain), 285 Hz (influence energy fields), 396 Hz (turn grief into joy), 417 Hz (facilitate change), 528 Hz (DNA refresh and/or repair), 639 Hz (reconnecting, relationships), 741 Hz (expressions/solutions), 852 Hz (return to spiritual order), and 963 Hz (awaken perfect state). In embodiments, these frequencies are generally reproduced on bass driver 22 that uses bone conduction, rather than being reproduced with air conduction on treble driver 17. In embodiments, the relaxing, healing or meditative sounds, such as the solfeggio frequencies, may be played superimposed over other audio that is being reproduced.

Figure 5A:
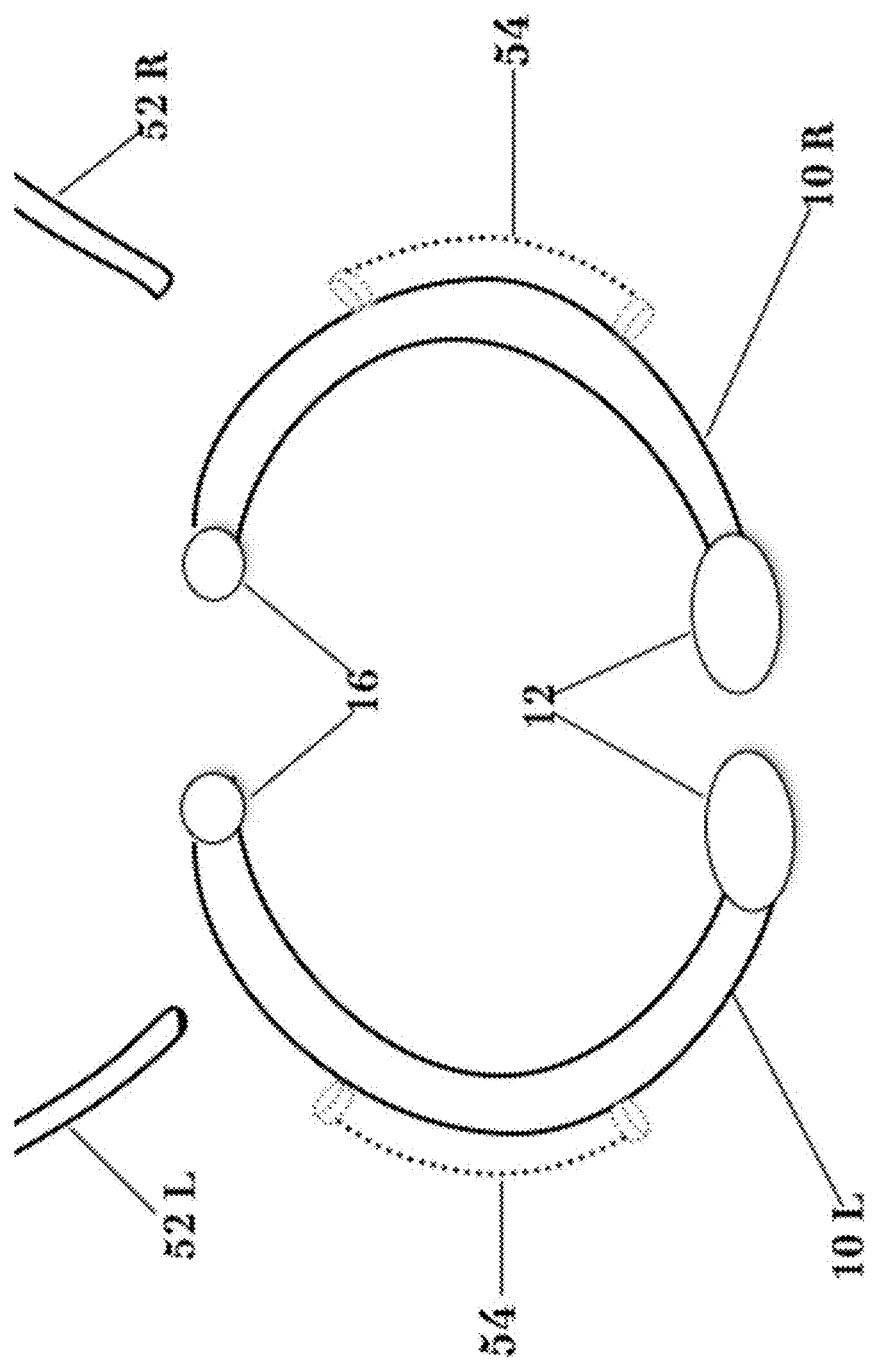
FIG. 5A is a perspective view of two earpieces in accordance with an exemplary embodiment of the present invention in which the earpieces are configured to be attachable to the back of eyeglasses.

In embodiments, as shown in FIG. 5A, earpiece 10 or a pair of earpieces 10R, 10L may also be provided with a connector 54 for each earpiece to connect to the sides (temples) of a pair of eyeglasses 52 (such as conventional eyeglasses or sunglasses). Each connector 54 may take the form of a short sleeve, as shown, in which a first end of the sleeve slips onto and grips the outside of malleable tubing 14 in the vicinity of second assembly 16, and a second end of the sleeve slips onto and grips the outside of one of the sides 52R, 52L of eyeglasses 52. Other connectors 54 may alternatively be used to achieve similar results. In embodiments, connector 54 may be mounted to earpiece 10.

Connector 54 may be made, for example, of a tube-shaped material having a hollow passageway, that has elastic properties such as a thermoplastic elastomer (TPE) and more specifically an extruded TPE, which include copolymers or a physical mix of polymers (usually a plastic and a rubber) which consists of materials with both thermoplastic and elastomeric properties, to name a few. Connector 54 may alternatively be formed from one or more other materials, such as, for example, vinyl or PVC tubing.

Figure 5B:
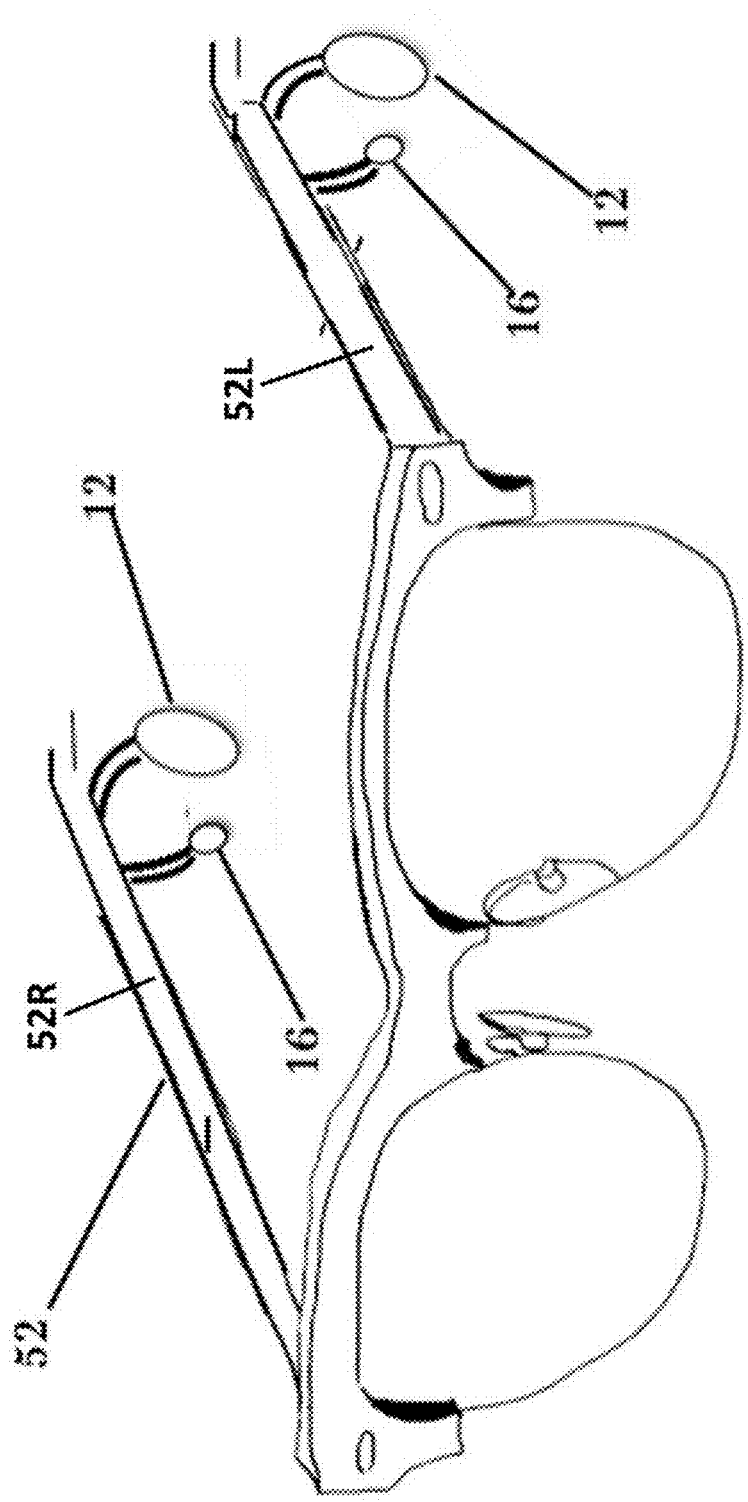
FIG. 5B is a perspective view of the two earpieces shown in FIG. 5A in accordance with an exemplary embodiment of the present invention after attachment to the back of eyeglasses.

FIG. 5B shows an exemplary embodiment of the present invention in which earpieces 10R and 10L are shown after they are attached to eyeglasses 52 with connector 54. The connection between the earpieces and the eyeglasses may be configured to secure the earpieces in place on the user's ear when earpiece(s) 10 are worn. For example, in embodiments, earpieces 10R, 10L are attached to the eyeglasses approximately midway between the treble and bass drivers 17, 22 such that the positions of drivers are adjustable by a user on the ear (e.g., the positions shown in FIG. 1C). In another exemplary embodiment, earpieces 10R, 10L may be inserted into connectors 54 with the positions of the treble and bass drivers flipped such that the first assembly 12 of each earpiece may be adjusted by a user to be positioned similar to the positioning shown in FIG. 1D. The connection may also be configured to store earpiece(s) 10 with eyeglasses 52 when earpiece(s) 10 and eyeglasses 52 are not in use. In other embodiments, at least one of earpieces 10R, 10L may be attached to the eyeglasses at a different position on the earpieces.

In embodiments, at least a portion of one or more of the earpieces may be embedded within (e.g., built into) the sides of the eyeglasses (e.g., temples) or straps rather than having the one or more earpieces 10 attached to the sides of the eyeglasses as shown in FIG. 5B. For example, the bass driver 22 may be at least partially embedded or recessed into the sides of the eyeglasses 52. This may be particularly advantageous where, for example, the earpieces are used for medical, auscultation devices, military (for game playing or for actual use), emergency services, or telecommunications purposes.

FIG. 6 shows a set of VR glasses 60 that is worn for engaging in virtual reality activities, such as playing games, watching 3D videos, interacting in a 3D space, to name a few. Examples of such VR glasses 60 include Oculus Rift from Oculus VR, LLC, Virtual Private Theater Glasses from Spexis Technology of Melbourne, Australia, and Smart Glasses from Vuzix® Corporation of West Henrietta, N.Y., U.S.A., to name a few. In embodiments, the present invention allows for the embedding of the first speaker driver (e.g., the bass driver) within the sides of VR glasses 60, such as in the sides of strap 62 that secures VR glasses 60 onto a user's head or in the sides of VR glasses 60 that have temples like conventional eyeglasses. When embedded in the VR glasses 60, the glass/earpiece combination is, in embodiments, configured so that the first speaker driver, with the bone conducting element, is positioned behind the ear and the second speaker driver, with the treble element, is positioned in front of the ear in proximity to the user's ear canal. In embodiments, the placement of the earpiece may be so that the bass (BC) driver conducts sounds to at least one of the mastoid process, mandible, skull sutures, temporal bone, glabella, frontal bone, the skull in toto, zygomatic arch, or trigeminal nerve of the user. Where a set of VR glasses has sides similar to sides 52R, 52L of eyeglasses 52 shown in FIG. 5A, the first assembly may be similarly embedded into the sides of VR glasses 60.

In certain embodiments of the earpiece, eyeglasses, or VR glasses described above, the second assembly may be configured for placement in the ear canal rather than outside the ear canal.

Using the above-described features, a user can enjoy the advantages of improved and customized sound delivery without being oblivious to significant ambient sounds of which a user should be aware. The user can also bend the earpiece for simplified and secure storage or for an alternative use, such as for ornamentation. The present invention also advantageously removes the earpiece from the ear canal, if desired, to reduce the chance for damaging a users hearing. In addition, other benefits may include a reduction in ear infections or ear discomfort.

Now that embodiments of the present invention have been shown and described in detail, various modifications and improvements thereon will become readily apparent to those skilled in the art. Accordingly, the exemplary embodiments of the present invention, as set forth above, are intended to be illustrative, not limiting. The spirit and scope of the present invention is to be construed broadly and not limited by the foregoing specification.

What is claimed is:

1. A set of earpieces, comprising a first earpiece for a right ear and a second earpiece for a left ear, each of the first and second earpieces comprising:
   (a) a first speaker driver configured to be positioned behind a user's ear and on skin of the user so as to perform bone conduction via a mastoid bone of the user to reproduce a first range of frequencies of an audio signal that are below a first predetermined value using bone conduction of sound;
   (b) a second speaker driver configured to be positioned away from the first speaker driver and outside of the user's ear canal without completely covering the user's ear canal when worn and electrically connected to the first speaker driver to reproduce a second range of frequencies of the audio signal that are above a second predetermined value which is the same as or greater than the first predetermined value using air conduction of sound thereby allowing the user to hear ambient sounds; and
   (c) a first malleable tubing, connecting the first and second speaker drivers, that enables the first and second speaker drivers to be adjusted to fit on the user's ear;
   wherein the set of earpieces further comprise a second malleable tubing to connect together the set of earpieces such that the second malleable tubing is electrically connected via a first electrical connector at a first end of the second malleable tubing directly to the first earpiece of the set of earpieces and a second electrical connector is connected directly at a second end of the second malleable tubing to the second earpiece of the set of earpieces,
   wherein the second malleable tubing is threadable through a piece of clothing and wherein the first and second earpieces are releasable from the second malleable tubing, and
   wherein the first and second earpieces are configured to be connectable and reshapable into a necklace, and wherein each of the first and second earpieces have one or more connectors that are configured to connect the first and second earpieces to form the necklace.

2. The set of earpieces of claim 1, wherein the first speaker driver of each of the first and second earpieces is included with a first assembly, and wherein the first assembly of each earpiece further comprises:
   (i) a digital signal processor or a passive crossover having an audio input for inputting the received audio signal to be reproduced by the earpiece, a first audio output to output a first part of the audio signal to the first speaker driver that is operatively connected to the digital signal processor, and a second audio output to output a second part of the audio signal to a second speaker driver that uses air conduction; and
   (ii) a power input or a power source for powering the earpiece.

3. The set of earpieces of claim 1, wherein the first predetermined value is in a range of from 1 kHz to 6 kHz.

4. The set of earpieces of claim 1, wherein the first predetermined value is in a range of from 1 kHz to 2 kHz.

* * * * *